June 27, 1967     W. L. RINGLAND     3,328,616

DYNAMOELECTRIC INDUCTION MACHINES

Filed Dec. 31, 1962

Inventor
William L. Ringland
By Robert B. Benson
Attorney

United States Patent Office 3,328,616
Patented June 27, 1967

3,328,616
DYNAMOELECTRIC INDUCTION MACHINES
William L. Ringland, Greendale, Wis., assignor to Allis-Chalmers Manufacturing Company, Milwaukee, Wis.
Filed Dec. 31, 1962, Ser. No. 248,754
3 Claims. (Cl. 310—166)

This application relates generally to dynamoelectric machines. More specifically the invention relates to induction motors.

It is a common practice to build induction motor rotors with a laminated steel core and a squirrel cage winding consisting of conductors in axial slots in the core short circuited at both ends by conducting end rings. The conductors and end rings may be cast in place as an integral unit, or bars may be inserted in the slots and joined to the end rings by welding or brazing.

The resistance of the squirrel cage is designed to provide a suitable compromise between the objectives of minimum slip at full load and adequate starting torque with minimum starting current. This normally results in the ratio of resistance to reactance and the rotor power factor being relatively high at full load and relatively low at starting.

The starting performance can be improved by the use of deep bars or "eddy current" bars in which the depth of bars is sufficient to allow eddy current effects to increase the ratio of resistance to reactance at the higher slip frequencies. Double or triple cages have a similar effect. All of these constructions are more expensive than the more usual simple squirrel cage.

A significant limitation for all squirrel cage windings is their thermal capacity for absorbing the heat developed in the rotor with frequent starts or reversals, or when starting high inertia loads. Elevated temperatures cause loss of mechanical strength and expansion of the materials often adds to the stresses. These effects may cause failure of the cage materials or joints.

Solid steel rotors for induction motors have been built for applications where the centrifugal forces require this stronger construction or where starting performance and higher thermal capacity are more important than normal running conditions. An example of the latter condition is the use of a solid steel rotor in a starting motor for a large synchronous condenser. The solid steel rotor, in addition to being mechanically stronger, is better able to absorb heat throughout its entire mass because of its homogeneous nature.

The solid steel rotor generally has superior starting performance but poorer running performance as compared with the squirrel cage rotor. One reason for this is that eddy current effects in the steel result in a ratio of resistance to reactance of about 1.5 corresponding to the rotor power factor of about .82 for all values of slip. These values are obtained in practice and include the effects of hysteresis and of the nonlinear relationship between flux density and magnetomotive force in the steel. In a material without hysteresis and with a linear relationship between flux density and magnetomotive force, the ratio of resistance to reactance would be 1.0 and the rotor power factor would be .707.

The induction machine rotor of this invention contemplates a core of laminated steel surrounded by a shell of electrically conducting magnetic material. By selecting a suitable thickness for the shell, lower slip and higher power factor at full load can be obtained, as compared with a solid steel rotor while the favorable starting performance of the solid steel rotor can be preserved. In comparison with a squirrel cage rotor the rotor of this invention has simpler and more rugged construction and improved starting performance.

Therefore, it is the object of this invention to provide a new and improved induction type dynamoelectric machine.

Another object of this invention is to provide a new and improved induction motor.

Another object is to provide a new and improved rotor for an induction motor having an iron laminated core surrounded by a magnetic, electrically conducting shell.

Other objects and advantages of this invention will be apparent from the following description when read in connection with the accompanying drawings in which.

Figure 1:
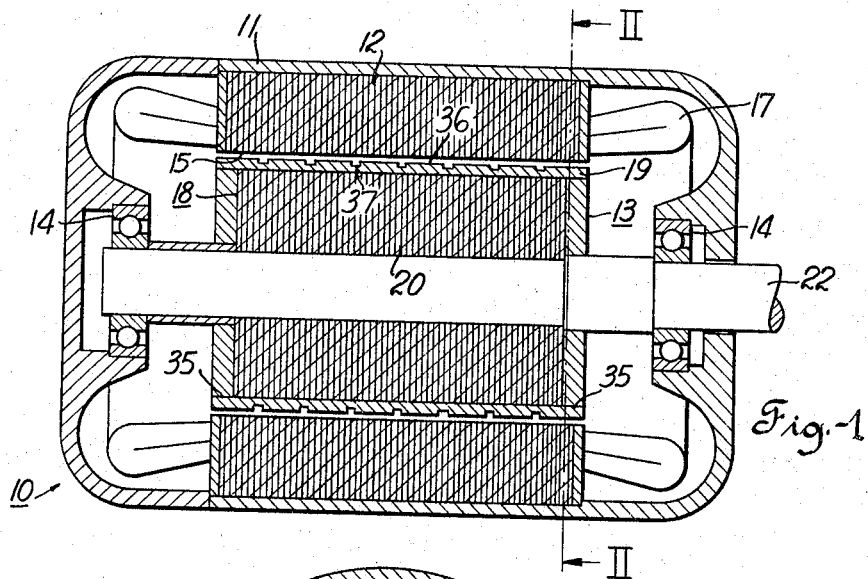
FIG. 1 is a cross sectional view of an induction motor of this invention.
Figure 2:
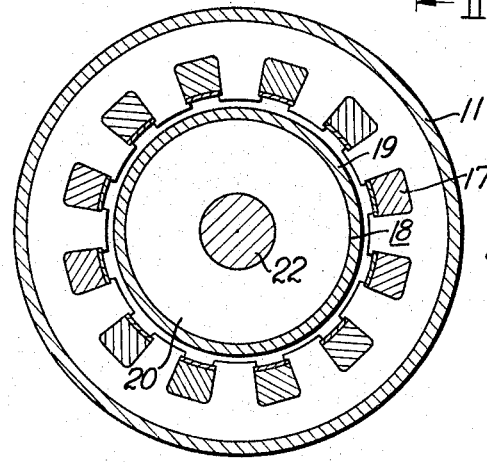
FIG. 2 is a view taken along the line II—II of FIG. 1.

Referring more specifically to the drawings by characters of reference, the invention is illustrated in an induction motor 10 having an outer casing 11 and an annular stator 12. A rotor 13 is rotatably mounted in bearings 14 and positioned within the bore 15 of the stator 12. The stator 12 has a plurality of arcuately spaced coils 17 positioned therein which are adapted to be connected to a suitable source of alternating current so as to provide a rotating magnetic field of two or more poles. Such a stator is commonly used in induction motors.

The rotor 13 is made up of an inner core 18 with a solid shell 19 surrounding the core. The core 18 consists of a plurality of iron laminations 20 which are electrically insulated from each other and stacked together and clamped to form a cylinder. This core is mounted on a suitable shaft 22 which is mounted in bearings 14 which are in turn mounted in the casing 11 of the motor. Immediately surrounding the iron core is the solid cylindrical shell 19 made of an electrically conducting magnetic material. The shell 19 forms the secondary winding of the induction motor and also becomes an integral part of the flux carrying iron in the magnetic path of the motor.

The structure described above can be used as a generator by driving the rotor at a speed that exceeds that corresponding to the frequency and number of poles and by connecting the generator to a suitable source of reactive current. The shell is always on one core member and the armature windings on the other core member. Naturally it makes no difference which member is actually rotating or which member is inside the other.

Figure 3:
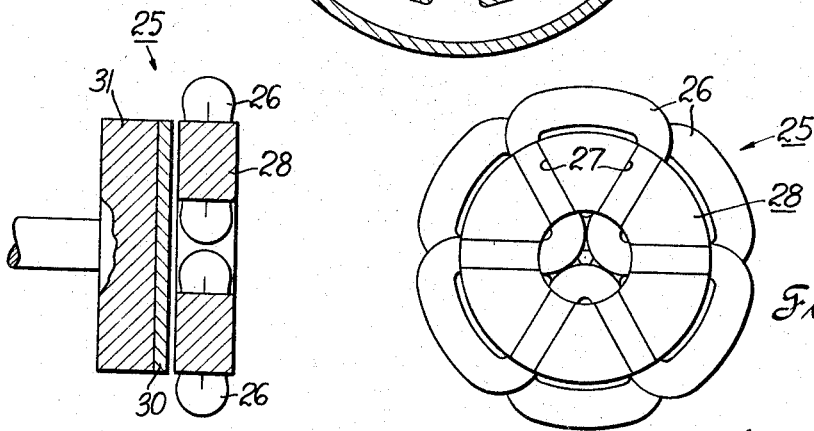
FIG. 3 is a cross sectional view of a disk type induction motor embodying a rotor of this invention.
Figure 4:
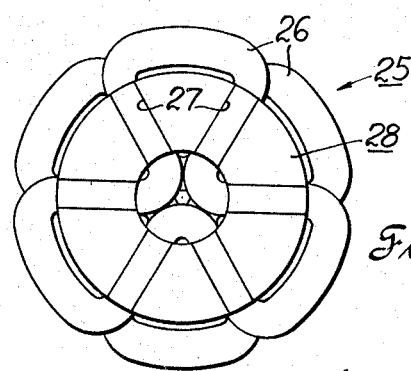
FIG. 4 is an end view of the motor shown in FIG. 3.

It is also possible to construct a machine of this invention with disklike members having the air gap surface in a single plane rather than in a cylindrical surface such as in a conventional machine. Such a disk type machine 25 is illustrated in FIGS. 3 and 4. As shown in the drawings, the armature windings 26 are positioned in radial slots 27 in core member 28. The short-circuited secondary conductor 30, equivalent to the shell 19 of FIG. 1, is a disk 30 connected to the core 31. The disk 30 is positioned on the side of core 31 adjacent the core 28 containing the armature windings and is separated from that core by an air gap.

The most suitable thickness for the shell 19 is related to the so-called skin thickness or depth of penetration which is determined by the following expression:

$$d = 3.16 \times 10^3 \sqrt{\frac{P}{fu}}$$

where $d$ equals depth of penetration in inches, $P$ equals resistivity of the shell material in ohms-inches, $f$ equals rotor (slip) frequency cycles per second, $u$ equals permeability of the shell material relative to vacuum.

The depth of penetration, it will be noted, decreases with increasing slip frequency.

In the preferred embodiment of this invention, the shell thickness is greater than the depth of penetration at standstill and less than the depth of penetration for normal running conditions at full load. At standstill, the ratio of rotor resistance to reactance would be essentially the same as for the solid steel rotor. For normal running at lower slip frequency, the current distribution in the shell is limited by the boundary of the shell rather than by eddy current effects and the laminated core provides a path for the magnetic flux, allowing more of the flux to link the conducting shell. This results in a higher ratio of resistance to reactance and a more favorable rotor power factor as compared with the solid steel rotor.

For example, if all the flux were to link the entire shell, the rotor or secondary power factor would be unity. Hence, in this motor in which the shell thickness is small and a substantial portion of the flux links the entire shell, the power factor is high at low slip frequencies and approaches unity for larger machines.

The paths for current at the ends of the rotor can be provided by extending the shell beyond the laminated core as shown in FIG. 1 or by attaching separate end rings to the ends of the shell, as by welding or brazing. The extensions 35 of the shell 19 should normally be approximately one-third the pole pitch at the rotor surface. A shorter extension would increase the total shell impedance, while a greater extension would have little effect. Attached rings of lower resistance, nonmagnetic material such as copper or copper alloy would decrease the rotor impedance.

One purpose of this invention is to minimize the stator current and the size of the stator conductors required for a given horsepower output in a motor. The nearer to unity power factor for the motor the less current required for the stator and hence smaller conductors can be used. This, of course, reduces the size of the stator and hence the overall size of the motor.

As shown in FIG. 1, the surface 36 of the shell 19 may have circumferential grooves 37 to reduce high frequency surface loss due to the stator slot openings and to provide a greater surface for heat dissipation.

Although but two embodiments have been illustrated and described, it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. A dynamoelectric machine comprising: an annular stator, windings positioned in said stator and adapted to be connected to a source of electric power to provide a rotating magnetic field, a rotor mounted for rotation within said stator, said rotor comprising a cylindrical core made of a plurality of stacked iron laminations and a cylindrical shell of magnetic electrically conducting material surrounding said core, the thickness of said shell being substantially less than the effective depth of penetration at normal running speed.

2. A dynamoelectric induction machine comprising: an annular stator, winding positioned in said stator and adapted to be connected to a source of electric power to provide a rotating magnetic field, a rotor mounted for rotation within said stator, said rotor comprising a cylindrical core made of a plurality of stacked iron laminations, and a cylindrical shell of magnetic electrically conducting material surrounding said core, the thickness of said shell being between the effective depth of penetration at standstill and at normal running speed, the depth of penetration ($d$) being calculated according to the formula $$d = 3.16 \times 10^3 \sqrt{\frac{P}{fu}}$$

where $p$ equals resistivity of the shell in ohms-inches, $f$ equals rotor slip frequency in cycles per second and $u$ equals permeability of the shell material relative to a vacuum.

3. A dynamoelectric induction machine comprising: a first member having a laminated core, a second member having a laminated core positionable adjacent said first member to define therebetween an air gap lying in a single plane, one of said members having a disk of magnetic electric conducting material connected to its core between said members, thickness of said disk being between the effective depth of penetration at standstill and at normal running speed, the depth of penetration ($d$) being calculated according to the formula $$d = 3.16 \times 10^3 \sqrt{\frac{P}{fu}}$$

where $p$ equals resistivity of the shell in ohms-inches, $f$ equals rotor slip frequency in cycles per second and $u$ equals permeability of the shell material relative to a vacuum, the other of said members having windings formed therein and adapted to be connected to a source of electric power, one of said members being mounted to rotate relative to the other of said members.

References Cited

UNITED STATES PATENTS

| | | | |
|---|---|---|---|
| 2,673,301 | 3/1954 | Richter | 310—86 |
| 2,842,729 | 7/1958 | Hillman | 318—220 |
| 3,052,958 | 9/1962 | Anderson | 310—86 |

FOREIGN PATENTS

| | | |
|---|---|---|
| 857,071 | 12/1960 | Great Britain. |
| 864,644 | 5/1961 | Great Britain. |

MILTON O. HIRSHFIELD, *Primary Examiner.*

D. F. DUGGAN, *Assistant Examiner.*